(12) United States Patent
Kallio

(10) Patent No.: US 8,472,323 B2
(45) Date of Patent: Jun. 25, 2013

(54) MONITORING CONNECTION QUALITY

(75) Inventor: Juha Kallio, Helsinki (FI)

(73) Assignee: Nokia Corporation, Espoo (FI)

( * ) Notice: Subject to any disclaimer, the term of this patent is extended or adjusted under 35 U.S.C. 154(b) by 728 days.

(21) Appl. No.: 11/213,807

(22) Filed: Aug. 30, 2005

(65) Prior Publication Data

US 2006/0250955 A1  Nov. 9, 2006

(30) Foreign Application Priority Data

May 9, 2005 (FI) .................................... 20050493

(51) Int. Cl.
*G01R 31/08* (2006.01)
(52) U.S. Cl.
USPC ...................................................... 370/235
(58) Field of Classification Search
USPC ............... 370/229, 230, 235, 252, 254, 332, 370/516
See application file for complete search history.

(56) References Cited

U.S. PATENT DOCUMENTS

| | | | |
|---|---|---|---|
| 7,310,334 B1* | 12/2007 | FitzGerald et al. ............ | 370/389 |
| 2002/0046084 A1* | 4/2002 | Steele et al. ................... | 705/14 |
| 2002/0172209 A1* | 11/2002 | Ohta et al. ..................... | 370/401 |
| 2004/0203791 A1* | 10/2004 | Pan et al. ....................... | 455/442 |
| 2004/0218546 A1* | 11/2004 | Clark ............................. | 370/252 |
| 2005/0148362 A1* | 7/2005 | Jagadeesan et al. .......... | 455/555 |

OTHER PUBLICATIONS

RFC 3260, D. Grossman, "New Terminology and Clarifications for Diffserv", Apr. 2002, pp. 1-10.
RFC 1633, R. Braden et al., "Integrated Services in the Internet Architecture: An Overview", Jun. 1994, pp. 1-31.
ITU-T Recommendation H.248.1, "Gateway Control Protocol: Version 2", May 2002, pp. 1-137.
"Unlicenced Mobile Access (UMA) Architecture (Stage 2)", R1.0.1, Oct. 8, 2004, pp. 1-80, XO-002381341.
Translation of First Office Action issued in connection with corresponding Chinese Application No. 200680022099.9; Issuing Date: May 27, 2010; 28 sheets.
International Search Report and Written Opinion for International Application No. PCT/IB2006/001169 date Jul. 17, 2006.
3GPP TS 26.090 V6.0.0, 3$^{rd}$ Generation Partnership Project; Technical Specification Group Services and System Aspects; Mandatory Speech Codec Speech Processing Functions; Adaptive Multi-Rate (AMR) Speech Codec; Transcoding Functions (Release 6), (Dec. 2004), pp. 55 pages.

(Continued)

*Primary Examiner* — Kwang B Yao
*Assistant Examiner* — Tung Q Tran
(74) *Attorney, Agent, or Firm* — Alston & Bird LLP

(57) ABSTRACT

Quality of a connection between a terminal and a gateway is monitored in the gateway. The gateway informs a core network element handling signaling relating to the connection about the quality of the connection. The core network element triggers an access network control element to inform the terminal about the quality of the connection. The gateway or the core network element may determine when to trigger the access network control element. Upon receiving triggering information from the core network element, the access network control element informs the terminal about the quality of the connection for indicating changes in the quality of connection between the terminal and the gateway.

33 Claims, 7 Drawing Sheets

OTHER PUBLICATIONS

ITU-T, G.711 Appendix I, Series G: Transmission Systems and Media, Digital Systems and Networks, Digital Transmission Systems—Terminal Equipments—Coding of Analogue Signals by Pulse Code Modulation, Pulse Code Modulation (PCM) of Voice Frequencies, Appendix I: A High Quality Low-Complexity Algorithm for Packet Loss Concealment With G.711 (Sep. 1999), pp. 1-18.

ITU-T, G.711 Appendix II, Series G: Transmission Systems and Media, Digital Systems and Networks, Pulse Code Modulation (PCM) of Voice Frequencies, Appendix II: A Comfort Noise Payload Definition for ITU-T G.711 Use in Packet-Based Multimedia Communication Systems, (Feb. 2000), pp. 1-10.

ITU-T G.711, General Aspects of Digital Transmission Systems, Terminal Equipments, Pulse Code Modulation (PCM) of Voice Frequencies, (ITU 1988, 1993), pp. 1-10.

Rejection Decision for Chinese Patent Application No. 200680022099.9, dated Jan. 19, 2012; 9 pages.

Office Action from Taiwanese Application No. 95115838 received Nov. 22, 2012.

UMA Architecture (Stage 2) R1.0.4 (May 2, 2005) Technical Specification; "Unlicensed Mobile Access (UMA); Architecture (Stage 2)"; 87 pages.

* cited by examiner

```
ULQI, UL Quality Indication (octet 3)
Bits
4   3   2   1
0   0   0   0   Quality ok
0   0   0   1   Radio problem
0   0   1   0   Network problem
0   1   0   0   Undetermined problem Other values are reserved for future use
```

MONITORING CONNECTION QUALITY

BACKGROUND OF THE INVENTION

1. Field of the invention

The present invention relates in general to monitoring connection quality. In particular the present invention relates to monitoring connection quality in a communication system having split architecture.

2. Related art

A communication system can be seen as a facility that enables communication between two or more entities such as user equipment and/or other nodes associated with the system. The communication may comprise, for example, communication of voice, data, multimedia and so on. The communication system may be circuit switched or packet switched. The communication system may be configured to provide wireless communication. Communication systems able to support mobility of communications devices across a large geographic area are generally called mobile communications system. In cellular communication systems a communications device typically changed the cell via which it communicates. Some examples of a cellular communications system are the Global System for Mobile Telecommunications (GSM) and the Universal Mobile Telecommunications System (UMTS).

Traditionally public mobile communications systems have used licensed radio frequencies, which means use of a radio frequency band allocated to mobile telephone networks by national or international authorities or organizations. Recently, alternative methods for accessing mobile communications systems have been introduced. For example, a wireless local area network (WLAN) or any other wireless network may be operably connected to a mobile communications system, typically via a packet-switched network and a gateway. A communications device may establish a packet data connection to the gateway, which then provides access to the mobile communication system for the communications device by relaying user-plane data and control-plane signaling between the communications device and the mobile communications system. The wireless network may use a radio frequency different from the frequency band used by a mobile communications system, and typically the communication protocols used in the short-range wireless network are different from the communication protocols used in the mobile communications system. Unlicensed Mobile Access (UMA) and the 3rd Generation Partnership Project (3GPP) WLAN Interworking are examples of proposals for providing access to a mobile communications system via a wireless network.

FIG. 1 shows schematically access to a mobile communications system via a traditional cellular access network 110 and via an alternative access network 130. The cellular access network 110 has transceiver network elements 111 connected to control network elements 112. FIG. 1 shows two transceiver network elements 111a, 111b as examples. In GSM, the transceiver network elements are called base stations and the control network elements are called base station controllers.

The core network 120 of the mobile communications system contains various network elements. In the following, the names of the GSM network elements and General Packet Radio Service (GPRS) network elements are used, but it is appreciated that in mobile communications network in accordance with other standards the names may be different. The core network 120 contains mobile switching centers 121 for supporting circuit-switched connections, a home location register 122 for storing subscriber information, and GPRS support nodes. The GPRS support node include at least a serving GPRS support node (SGSN) 123 and a gateway GPRS support node (GGSN) 124. Packet data connections to further networks are made via the GGSN.

Mobile communications systems and their cellular access networks 110 typically support transfer of connections from on transceiver network element 111a to a further transceiver network element 111b. The transfer of connection is typically called a handover. When a terminal 101 moves, it may enter the coverage area of a further transceiver network element. Depending, for example, on the signal quality and amount of terminals in the area, it may be advantageous to make a handover and start to use the further transceiver network element. A user of the terminal typically should not notice the handover, as the aim is to perform the handover without breaks in the connectivity.

FIG. 1 shows also an access network 130 containing transceiver elements 131, which are often called access points. Some examples of technologies, using which the access network 130 may be implemented, are Wireless Local Area Networks (WLAN) and Bluetooth. Other wireless networks or ad hoc networks may also be used. Typically the access network 130 does not support handovers from one access point to another, but connections are typically set up again if a terminal moves outside the coverage area of one access point.

The access network 130 may be used as an alternative access network to the mobile communication network. In accordance with the Unlicensed Mobile Access (UMA) architecture, the access network 130 is connected via a packet data network 140 to an UMA network controller (UNC) 151. The UMA network controller 151 has various interfaces to communicate with the relevant network elements in the core network 120. Typically there is needed an additional authentication server 152 in the core network 120, providing access to the subscriber information in the HLR 122 for the UNC 151. In FIG. 1, the authentication server 152 is shown to be an Authentication, Authorisation and Accounting (AAA) server.

FIG. 2a shows in more detail the UMA functional architecture. In the UMA network controller 151 (or in connection with the UNC 151) there is typically a security gateway 153. This security gateway 152 is typically responsible for authenticating the terminal 101 (or the user thereof) using information available in the HLR 122 via the authentication server 152. The security gateway 152 is responsible also for data security (for example, authentication, encryption and/or data integrity) of the data transfer between the terminal 101 and the security gateway 152. This data transfer includes signaling data and user data. The user data may be packet data or circuit-switched data. The UMA network controller 151, in turn, is responsible for various signaling towards the core network 120, more particularly towards the mobile switching centers 121 and serving GRPS support nodes 123.

The UMA network controller 151 appears to the core network 120 as a base station subsystem of the access network 110. In other words, the core network 120 need not know that the terminal 101 is accessing the core network 120 via an alternative access network 130.

Recently Voice over IP (Internet Protocol) has become more and more important. Voice over IP refers to various techniques for carrying speech over packet data (most often over IP) instead over circuit switched connections. UMA technology differs from other voice over IP technologies by allowing seamless handovers for speech calls between cellular access networks and alternative access network. End users are able to move, for example, between WLAN access point coverage and cellular network coverage without losing the call connection. The seamless handovers are facilitated by the same link layer call control and mobility management procedures used in the WLAN access network (under the control of the UNC) and in the cellular access network.

FIG. 2 shows schematically one example of implementing the UMA access. In FIG. 2, there is a security gateway 253 responsible for securing the data transfer (user data and signaling data) between the terminal 101 and the security gateway 253. This security gateway 253 is typically operatively connected to the subscriber information store (HRL 122 in FIG. 2) of a mobile communications system via an authentication server 152 for authenticating the terminal 101 towards the mobile communications system before allowing access. The data transfer between the terminal 101 and the security gateway 253 is typically secured using the IPSec protocol suite.

The signaling UNC 251 is responsible for signaling and for packet data transfer. In the case of a GSM network, the signaling UNC 251 is connected to the MSC via a modified A interface. There may be a MSC server 254 in between the UNC 251 and the MSC 121 to implement the modified A interface.

Data to be carried by circuit-switched connections is directed from the security gateway 253 to a media gateway MGW 255. This media gateway 255 typically responsible for transcoding speech codecs used in the UMA network 130, 140 and in the operators core network. As an example, transcoding may occur between GSM Adaptive MultiRate Full Rate (GSM AMR FR) and G.711 Speech codec.

Speech quality within GSM networks has traditionally been good. Also in third generation cellular network a considerable amount of effort is put into ensuring speech quality. When the alternative access networks become more popular, the end users will inevitably compare the speech quality provided by the alternative access networks to the speech quality provided by traditional access networks. To meet the users' expectations, it is important to try to provide to good speech quality in the alternative access networks or, if needed and there is coverage, a handover to traditional access network.

Most likely UMA compliant terminal 101 will have some manual configuration possibilities for defining preferred radio access technologies. This way, if the terminal 101 is in the coverage area of both the access network 110 and the alternative access network 130, the terminal 101 may automatically choose the preferred radio access technology.

Regarding the perceived speech quality, many factors affect the speech quality the user perceives. As example, the audio/speech codec, the design of the radio interface, terminal design, and the quality of the connection all have an impact to the perceived speech quality. The design of the radio interface and the design of the terminal are fixed in a system. In theory, the selected audio codec thus has the greatest impact, but in practice the audio codec should be selected to match the available channel (connection) quality. It is therefore of utmost importance to have information about the quality of the connection over which speech/audio information is transmitted.

Some factors affecting the quality of the connection are end-to-end delay, variations in the end-to-end delay (jitter), variations in the jitter (wander), packet loss. Further factors affecting the perceived speech quality, in addition to the audio codec, are effective echo cancellation and voice activity detection.

To cope with changes in the quality of the connection and/or with the received speech quality, the UMA specifications define a procedure called Uplink Quality Indicator. The purpose is to inform the user (terminal) that the quality for the user plane connection has changed. An UMA compliant terminal may, upon receiving an Uplink Quality Indicator, to trigger handover or network selection from the UMA network to a traditional access network in order to achieve better quality of service. An UMA terminal typically cannot monitor quality of the uplink connection without assistance from the network.

It is appreciated that in the configuration shown in FIG. 2, the signaling UNC 251 is unable to inform the terminal about the quality of the connection for the speech data. The Uplink Quality Indicator procedure thus cannot be effectively used. A terminal may thus remain in a UMA network even if a better quality connection would be achievable by making a handover to a traditional access network.

One way to overcome the problem in connection with FIG. 2 is to provide a guaranteed quality of connections in the network 140. Current IP networks, however, typically do not provide a guaranteed quality of service or handle quality of service requirements. IP networks are typically best effort networks. Differentiated Services (Diffserv) is an approach which could be applied in the network 140, but this would mean that all relevant network elements should be updated to support Diffserv. Diffserv is discussed, for example, in Internet Engineering Task Force's (IETF) Request For Comments (RFC) 3260 "New Terminology and Clarifications for Diffserv". Intergrated Services (Intserv) is another approach, but it is not in practice used. Intserv is discussed, for example, in RFC 1633 "Integrated Services in the Internet Architecture: an Overview".

One option to overcome the problem is to rely on the user manually re-configuring the terminal to using a traditional access network instead of the alternative access network. This approach, however, requires that the user realizes that the lowered quality of speech is due to problems with the alternative access network and, furthermore, the user has to be able to do the manual re-configuration. Furthermore, a connection would not be handed over without interruptions in accordance with current specifications.

It is appreciated that although the previous description refers mainly to UMA, similar problems may arise in connection with other similar techniques.

Embodiments of the present invention aim to address at least some of the problems discussed above.

SUMMARY OF THE INVENTION

A first aspect of the present invention relates to a method for indicating changes in quality of service between a terminal and a gateway to a server, the method comprising monitoring quality of a connection between a terminal and a gateway in the gateway, and informing a core network element handling signaling relating to the connection about the quality of the connection by the gateway.

A second aspect of the present invention relates to a method for indicating quality of a connection between a terminal and a gateway to an access network control element, the method comprising handling signaling relating to a connection between a terminal and a gateway in a core network element, receiving information indicating quality of the connection between the terminal and the gateway from the gateway in the core network element, and triggering an access network control element to inform the terminal about the quality of the connection.

A further aspect of the present invention relates to a method for notifying a terminal of a quality of a connection between the terminal and a gateway, the method comprising receiving triggering information indicating quality of the connection between the terminal and the gateway in an access network control element from a core network element, and informing the terminal about the quality of the connection by the access network control element in response to receiving the triggering information.

A further aspect of the present invention relates a gateway configured to handle connections between at least one terminal and the gateway, monitor quality of the connections, and inform at least one core network element handing signaling relating to the connection about the quality of the connections.

An aspect of the invention relates to a core network element configured to handle signaling relating to connections between at least one terminal and a gateway, receive information indicating quality of a connection between a terminal and the gateway, and trigger an access network control element to inform the terminal about the quality of the connection.

A further aspect of the invention relates to an access network control element configured to handle signaling relating to connections between at least one terminal and a gateway, receive triggering information indicating quality of connections between a terminal and the gateway from a core network element handling signaling relating to the connection, and inform respective terminals about the quality of the connections based on the triggering information.

An aspect of the invention relates to Computer program product embodied on a computer readable medium, comprising computer readable instructions for causing a computer to carry out the following steps:

handling connections between at least one terminal and the gateway, monitoring quality of the connections, and informing core network elements handing signaling relating to the connections about the quality of the connection.

A further aspect of the invention relates to a computer program product embodied on a computer readable medium, comprising computer readable instructions for causing a computer to carry out the following steps:

handling signaling relating to connections between at least one terminal and a gateway, receiving information indicating quality of a connection between a terminal and the gateway, and triggering an access network control element to inform the terminal about the quality of the connection.

An even further aspect of the invention relates to a computer program product embodied on a computer readable medium, comprising computer readable instructions for causing a computer to carry out the following steps:

handling signaling relating to connections between at least one terminal and a gateway, receiving triggering information indicating quality of connections between a terminal and the gateway from a core network element handling signaling relating to the connection, and informing respective terminals about the quality of the connections based on the triggering information.

An aspect of the invention relates to a communication system comprising a gateway and a core network element.

BRIEF DESCRIPTION OF FIGURES

For a better understanding of the present invention and as how the same may be carried into effect, reference will now be made by way of example only to the accompanying drawings in which.

DETAILED DESCRIPTION OF PREFERRED EMBODIMENTS OF THE INVENTION

It is appreciated that in the following description reference is often made to the UMA and GSM network elements, but the invention may be applicable also in connection with other networks.

It is assumed here that signaling connections between the terminal and various network elements are still working even if the quality of the connection between the terminal and a media gateway is decreased. This is a reasonable assumption, as media flows suffer more readily from reduced quality of connection than exchange of signaling messages.

Figure 1A:
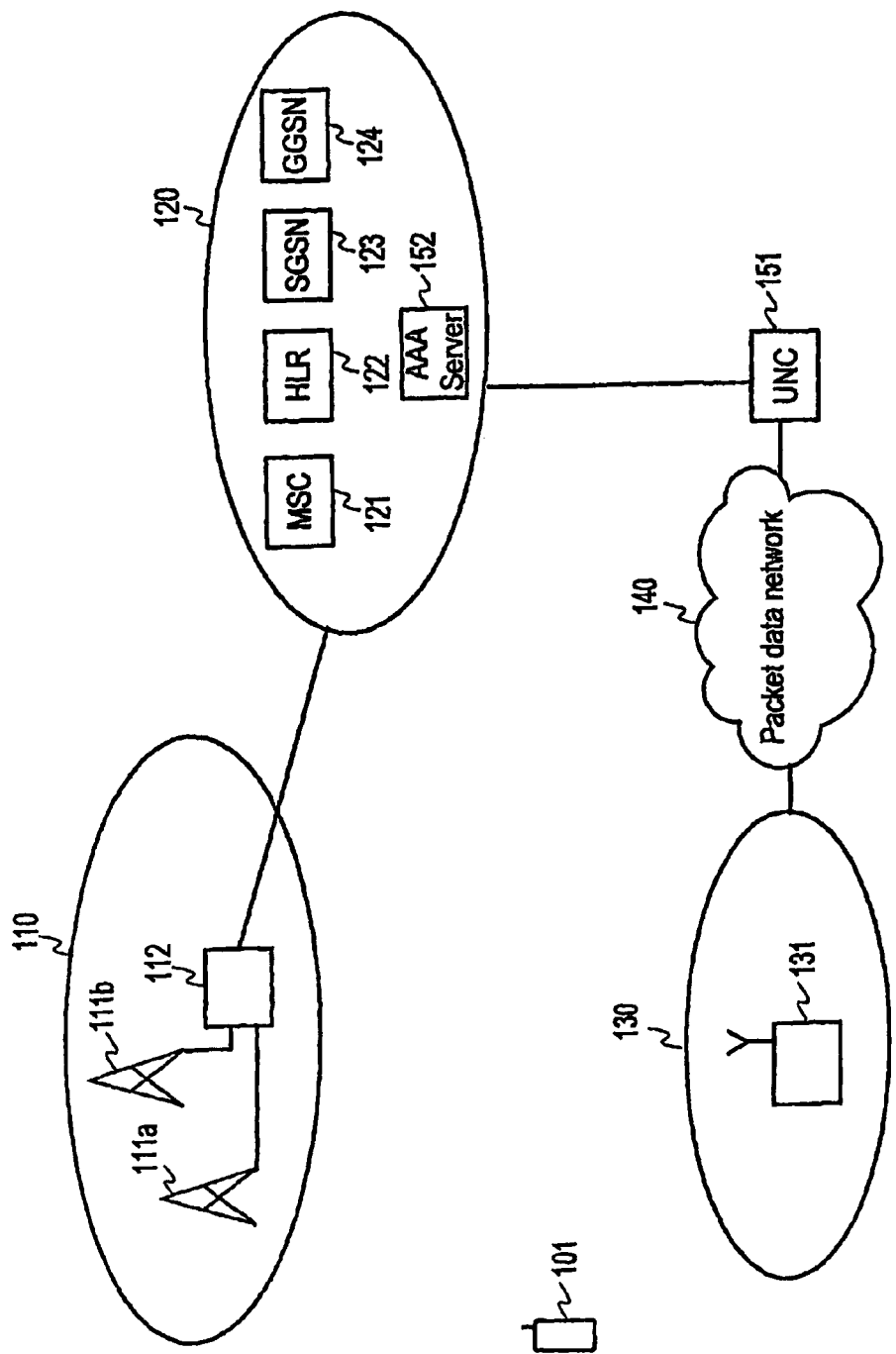
FIG. 1a shows schematically one example of providing access to a mobile communication system via a traditional access network and an alternative access network.
Figure 1B:
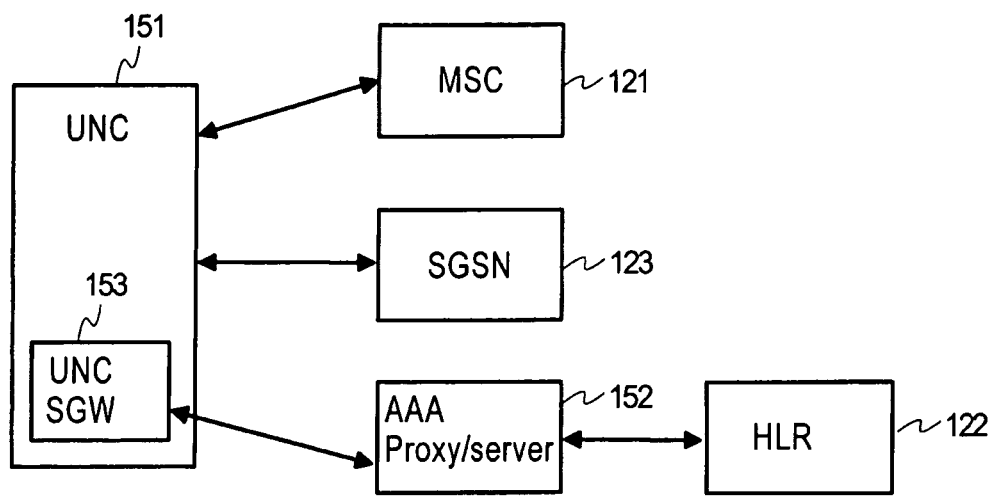
FIG. 1b shows schematically the functional connections between an UMA network controller and network elements in the core network of a mobile communication system.
Figure 2:
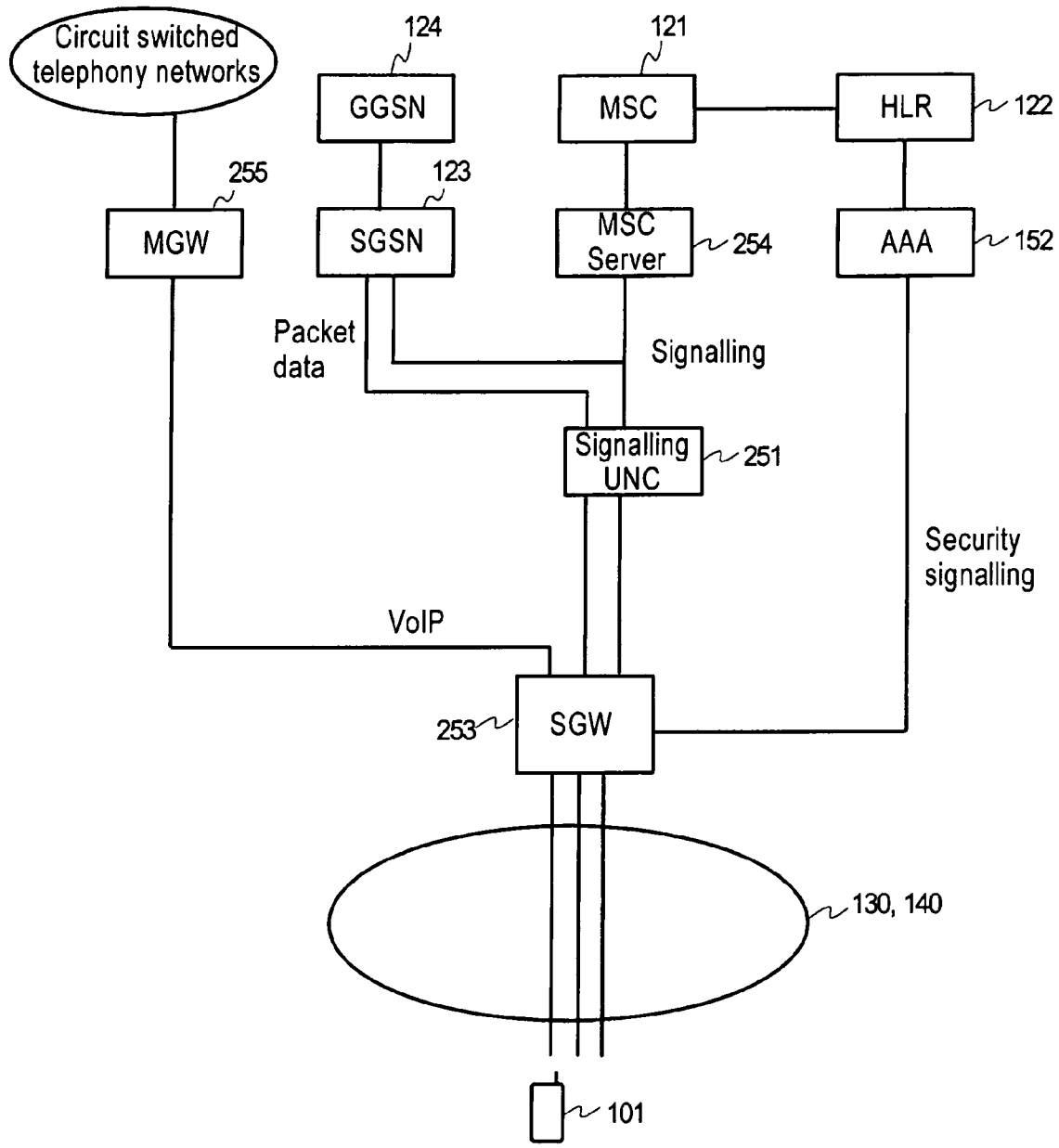
FIG. 2 shows schematically an example of a communication system where embodiments of the present invention are applicable.

FIGS. 1a, 1b and 2 have been discussed above in connection with the related art.

Figure 3:
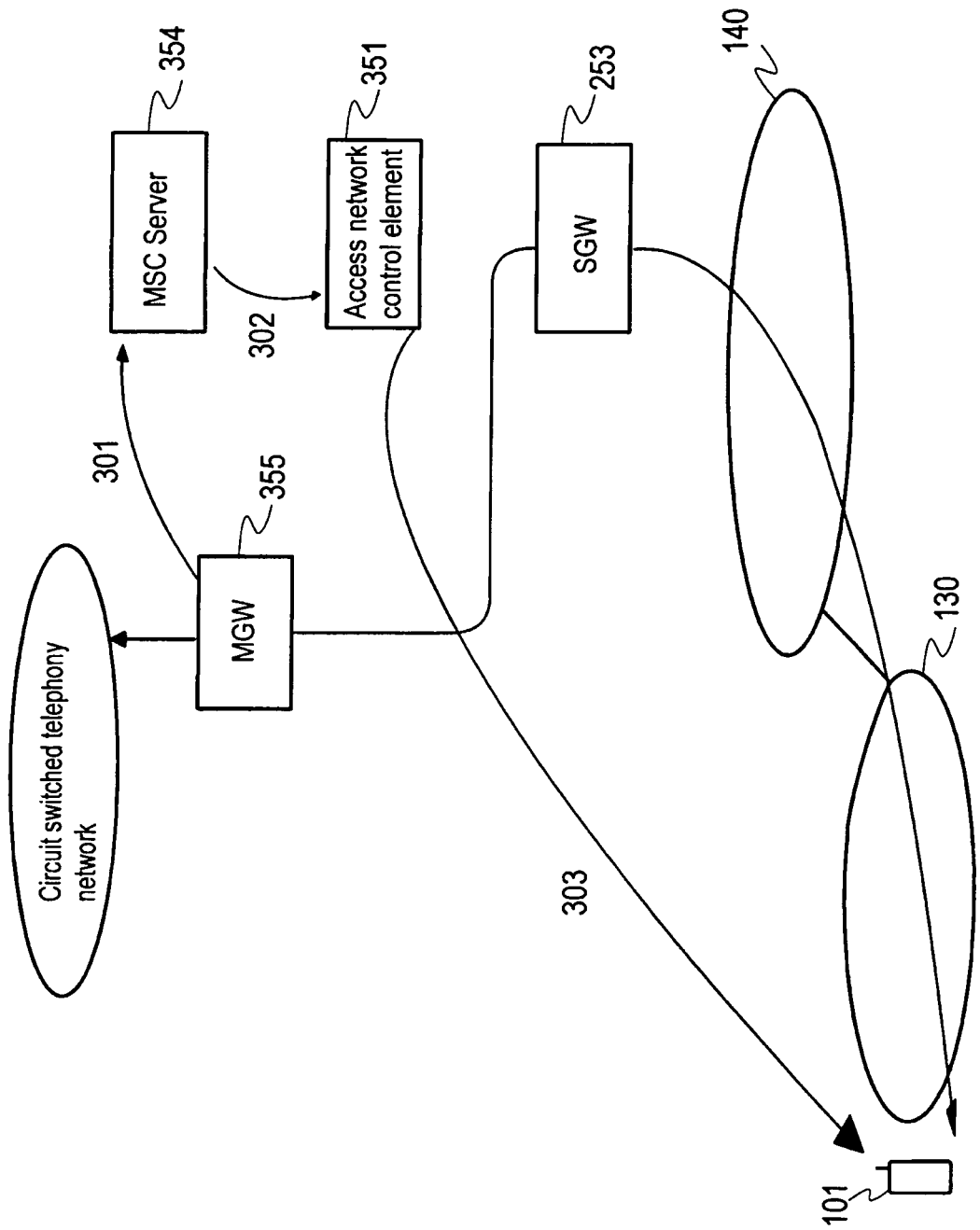
FIG. 3 shows schematically transfer of messages in accordance with a first embodiment of the invention.

FIG. 3 shows schematically transfer of messages in accordance with a first embodiment of the invention. The communication system 300 in FIG. 3 may be otherwise similar to that shown in FIG. 2, but the access network control element 351, the core network control element 354 and the media gateway 355 are slightly modified. The core network control element 354 is named in FIG. 3 as a MSC server, but instead of being a separate server, it may be, for example, a switching network element of the core network.

As in connection with FIG. 2, the media flow to be transferred over the circuit-switched connection is directed in the communication system 300 from the security gateway 253 to the media gateway 355. The media flow is in connection with Voice over IP a speech (audio) flow, but it may contain additionally or alternatively, for example, video information. Packet data is directed between packet data network elements (not shown in FIG. 3) and the terminal via the security gateway 253. Signaling relating to the packet data and the data to be transmitted over the circuit-switched connection is transferred between the terminal 101 and the access network control element 351. In FIG. 3, this access network control element 351 is named UNC.

The media gateway 355 is typically responsible for performing transcoding between different speech/audio/video codecs that are used in the terminal 101 and in the other endpoint of the connection.

The media gateway 355 may be provided with a number of tools or other suitable functionality to measure IP-based user plane traffic's quality. Some feasible factors describing the quality of the connection for the user data are jitter (changes in delay of data packets received from a terminal 101), wander (changes in jitter during ongoing connection), packet loss (proportion of data packets lost between the terminal 101 and the media gateway 355), and/or delay (average time difference between when data packets are generated by the terminal 101 and received by the gateway 355). For media flows transmitted over packet connections, the data packets are typically Realtime Transport and Streaming protocol (RTP) packets.

The media gateway 355 may collect information about quality of connections for statistics purposes, but in accordance with the first embodiment of the invention information about quality of connections is used to inform the terminal 101 about the quality of the connection. The measurement information may be locally stored within the media gateway 355 for the duration of the connection to the monitored. In addition to connection-specific information it is possible to collect cumulative quality information for calls. The cumulative information may be stored over the duration of single calls.

The media gateway 355 generates a quality indication 301, which is a message containing information indicating quality of the connection between the terminal 101 and the media gateway 355. The quality indication 301 is sent to the core network control element 354 from the media gateway 355. The quality indication 301 contains information indicating typically an average delay, jitter and packet loss for the connection. Information about the wander may also be present. The quality indication 301 typically contains an identifier identifying the relevant terminal 101 or connection. In accordance with the H.248 specifications, the quality indication 301 may indicate a termination, which is used to identify a certain IP-endpoint with a media gateway. The termination is associated with a call in the MSC Server 354. The media gateway 355 may send the quality indication 301 to the core network control element 354, for example, periodically. The timer could be tunable by operator, and it may range, for example, from 1 s-90 s.

Figure 4A:
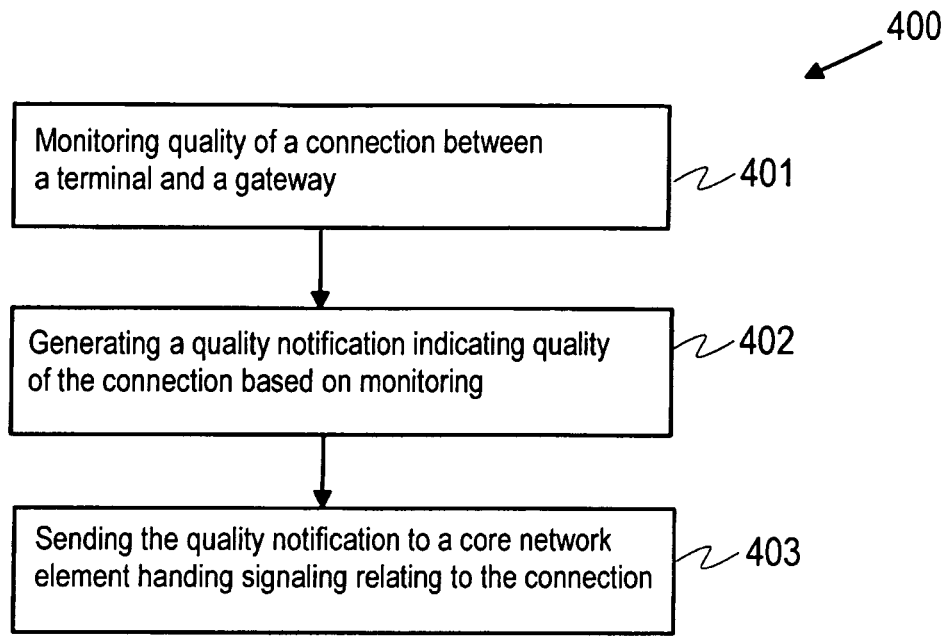
FIG. 4a shows a flowchart of a method of operating a media gateway in accordance with the first embodiment of the invention.

FIG. 4a shows a flowchart of a method 400 of operating a media gateway 355 in accordance with the first embodiment of the invention. Monitoring quality of the connection between a terminal 101 and the media gateway 355 is performed in step 401. When appropriate, the media gateway 355 informs a core network element 354 about the quality of the connection. This is shown in FIG. 4a with steps 402 and 403. The quality indication 301 is generated in step 402, and this quality indication 301 contains information indicating quality of the connection. In step 403, the quality indication is sent to the core network element 354 handling signaling relating to the connection between the terminal 101 and the gateway 355.

The quality indication 301 may be a message in accordance with the ITU-T Recommendation H. 248.1, Media Gateway Control protocol. H.248 is an extendable protocol. A NOTIFY message exists but that needs to be enhanced with new H.248 package or indication related to this invention.

The quality indication 301 may contain a new H.248 package. Packages are used to enhance the basic H.248 protocol to include new functionalities. Such packages are, for example, RTP package, Telephone package, and 3GUP package, to name a few. Alternatively, the quality indication 301 may contain RTP package's Statistics-content information, as defined in Annex E.12.4 of H.248 recommendation. The Statistics-content information includes information about packet loss, jitter and delay.

Delay, jitter, wander and packet loss have their effect on the quality perceived by the user. Consider, as an example, a Voice over IP speech flow. In principle the VoIP speech flow, which is transferred over, for example, the WLAN radio connections is subject to same issues that also affect to the VoIP when it is done over the traditional wireline IP connections. The effect of delay, jitter, wander and/or packet loss is larger for wireless VoIP than for traditional wireline based IP connections. This is due to the previously mentioned overall lack of QoS mechanisms in the WLAN radio access.

The quality of speech perceived by a listener is affected mostly by packet loss and huge jitter. Delay (latency) which naturally is not constant in existing WLAN networks, but by adding an adjustable further delay the overall delay can be maintained constant. This way the delay does not have such a radical impact to actual voice quality.

The impact caused by packet loss itself is related to the used packetization period for selected speech codec. If a longer packetization period is used (e.g. greater than 20 milliseconds) it means that a larger speech sample is encoded into single RTP packet than if a shorter period would be used. If a great number of RTP packets containing large speech samples are lost, the actual impact for receiver (listener) is more dramatic compared to situation where smaller blocks of speech would be lost instead. A similar impact is also present when more than one speech sample is encoded into RTP packet and the RTP packet is lost. It depends on the implementation of receiver what is the effect of lost packets. But a packet loss typically causes a silent period or the receiver tries to estimate the content of the lost packet based on previously received packets. One way of estimation is to simply repeat the latest received speech sample until a next packet with a speech sample, is received.

As a rule of thumb, the overall packet loss should not exceed 5 percentages for VoIP connections that involve WLAN. If the packet loss is higher for a VoIP connection, the voice quality will not most likely be acceptable for end users. The packet loss may be about 1-5% for achieving acceptable audio quality.

Jitter i.e. delay variations are typically caused by the bursty nature of IP connections, by reception of out-of-order packets as well as by the lack of QoS mechanisms either in WLAN radio connection or in other parts of the intermediate networks. Jitter causes problems at receiver end of the VoIP connection, and jitter has more significant effect to the perceived quality of speech than a constant delay. The receiver equipment is typically able to compensate the variations in delay and still be able to provide constant flow of speech frames to the transcoder in the receiver equipment. In practice this can be implemented either with static or dynamic jitter buffer implementation. Dynamic jitter buffer itself, when configured improperly, can cause additional problems in form of packet loss. However it is assumed that well implemented dynamic or static jitter buffer implementations can significantly enhance the voice quality perceived by end users. Dynamic or static delay buffers are thus considered to be very element functionality VoIP enabled terminals.

A widely accepted overall end-to-end delay is no more than 200 milliseconds for good voice quality. Voice quality will naturally be lower when end-to-end delay becomes larger than the previously mentioned value. According to some standards, the absolute maximum of end-to-end delay for any VoIP connection is 400 milliseconds. Another rule-of-thumb related to end-to-end jitter is to keep jitter as low as possible (e.g. 25 milliseconds) and compensate the jitter at least up to 150 milliseconds.

As is clear from the above discussion, it is possible to determine upper limits to acceptable delay, jitter, wander and packet loss as a triggering criterion. The limits may depend on the packetization period and/or codec used for the connection. Suitable values may be found, for example, by simulations or experiments. The values may be configurable by network operators.

One option for a triggering criterion is that one of the upper limits relating to delay, jitter and packet loss is exceeded. Packet loss is typically more critical than delay or jitter, and therefore an upper limit relating to only the packet loss may be defined. A further option is that two of the upper limits or all the upper limits are exceeded. An even further option for a triggering criterion is that the upper limit for at least one of the quality parameters depends on the value of at least one other quality parameter. It is alternatively possible to define a mathematical function taking the quality factors as inputs and then compare the value of the function to a threshold. It is clear to a skilled person that these are only some examples of many possible triggering criteria.

These upper limits may be treated as a triggering criterion for informing the terminal 101 about the poor quality of the connection. The triggering criterion may be implemented either in the media gateway 355 or in the core network element 354. If the triggering criterion is implemented in the media gateway 355, the quality indication 301 is typically sent in response to the quality of the connection being poorer than defined by the triggering criterion. If the triggering criterion is implemented in the core network element 354, the media gateway 355 typically just reports the quality of the connection by sending quality indications 301 periodically.

Figure 4B:
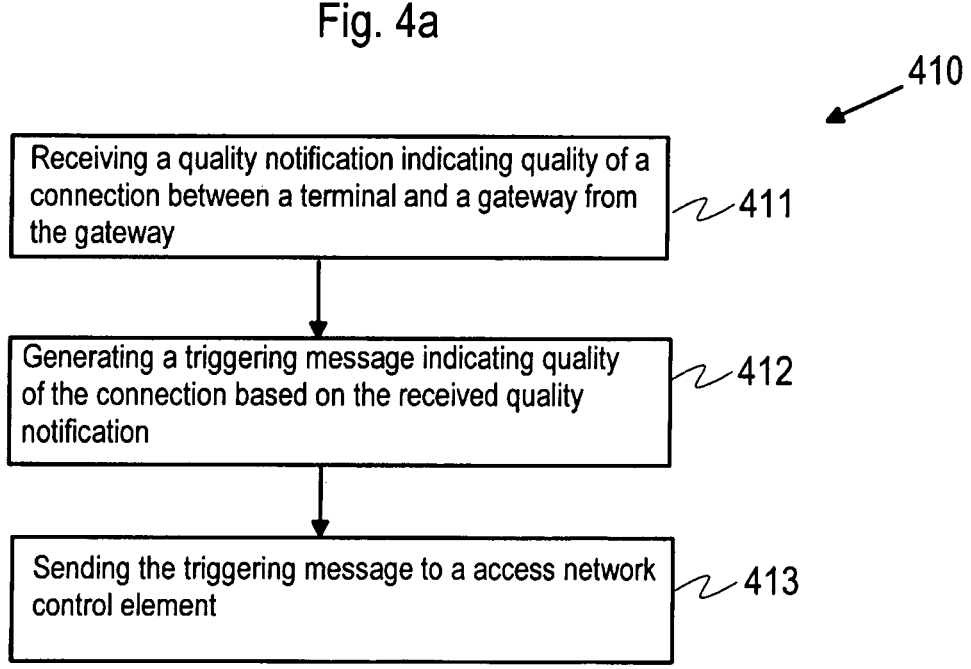
FIG. 4b shows a flowchart of a method of operating a core network element in accordance with the first embodiment of the invention.

FIG. 4b shows a flowchart of a method 410 of operating a core network element 354 in accordance with the first embodiment of the invention. In step 411, the core network element 354 receives a quality indication 301 (or other information indicating quality of the connection between the terminal 101 and the media gateway 355) from the media gateway 355. Thereafter, when appropriate, the core network element triggers the access control network element 351 to inform the terminal 101 about the quality of the connection. This is shown in FIG. 4b with steps 412 and 413. In step 412, the core network element 354 generates a triggering message indicating the quality of the connection between the media gateway 355 and the terminal 101. This triggering message 302 may be generated in response to receiving a quality notification 301 (if the triggering criteria are implemented in the media gateway 355). Alternatively, the core network element 354 may compare the quality of the connection reported by the quality indication 301 to the triggering criterion. If the reported quality of the connection is too poor (that is, the triggering criterion is fulfilled), the core network element 354 generates the triggering message 302 in response to the quality of the connection fulfilling the triggering criteria. In either case, the triggering message 302 is sent in response to the triggering criterion being fulfilled. In step 413, the triggering message 302 is sent to the access network control element 351.

The triggering message 302 contains information indicating the quality of the connection between the terminal 101 and the media gateway 355. Especially in the case of UMA and GSM, the triggering message 302 may be a message in accordance with the Base Station Subsystem Application Part (BSSAP) protocol. The BSSAP needs to be enhanced to carry sufficient information to the access network control element 351 so that this element then can use the information to generate an appropriate message, for example, the Up interface message UPLINK QUALITY INDICATOR towards the terminal.

Figures 4C, 5:
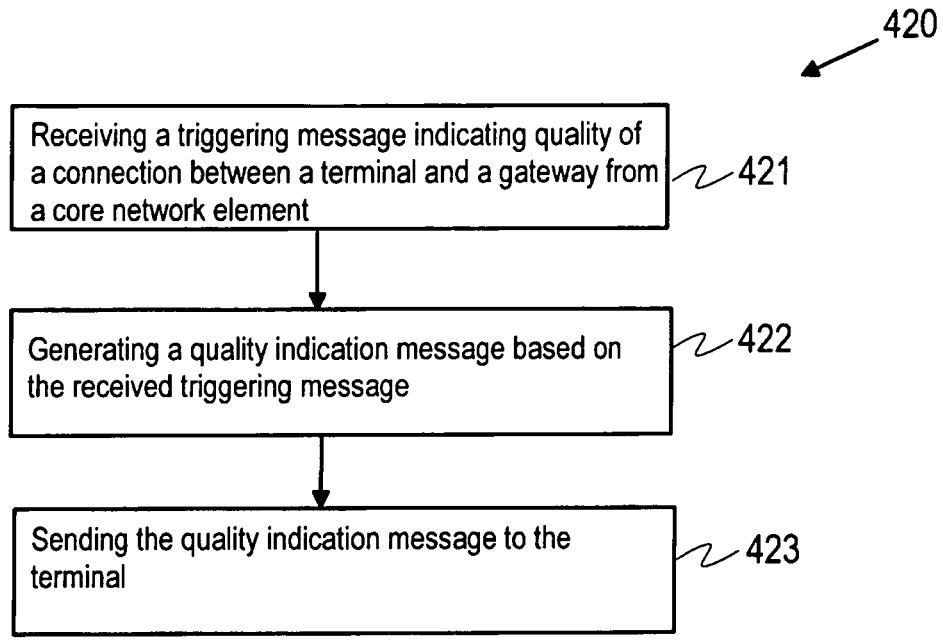
FIG. 4c shows a flowchart of a method of operating an access network control element in accordance with the first embodiment of the invention.
FIG. 5 shows the content of an URR Uplink Quality Indication message which is used in some embodiments of the invention.

FIG. 4c shows a flowchart of a method 420 of operating an access network control element 353 in accordance with the first embodiment of the invention. In step 421, the access network control element 353 receives the triggering message 302 from the core network element 354. The access network control element 351 then informs the terminal about the quality of the connection. In FIG. 4c, this is shown as steps 422 and 423. In step 422, the access network control element generates a quality indication 303 In step 423, the quality indication 303 is sent to the terminal 101 from the access network control element 351. The quality indication 303 passes via the security gateway 253 similarly as other signaling messages.

The quality indication 303 may be an URR (UMA Radio Resource) Uplink Quality Indication message of the interface between the terminal 101 and the access network control element 351. In the UMA, this interface is called the Up interface. FIG. 5 shows the content of an URR Uplink Quality Indication message. As can be seen from the table in FIG. 5, the values of the UL Quality Indication are quite loosely specified. For instance it is only possible to highlight very generally if the problem of having poor voice quality is caused by problem in radio or core network. The actual values of the UL Quality Indication may be a subject of a more detailed study and their choice may be very implementation dependent. In connection with the present invention, it is sufficient that the UL quality indication may be used to inform the terminal 101 that there is a problem with the quality of the connection.

When receiving an URR Uplink Quality Indication from the network via the UNC, an UMA-compliant terminal will typically initiate handover procedures as defined in stage 2 specification of UMA. It may occur that during the time when the terminal prepares for the handover to the cellular access network (for example, to GSM or GSM/EDGE), the quality of the connection between the terminal 101 and the media gateway 355 improves.

If the media gateway 355 sends quality notification periodically, the core network element 354 is able to determine the improvement in the quality. Alternatively, the media gateway 355 may be configured to inform the core network element 354 when/if the quality of the connection reaches an acceptable level after being too poor. This can be done, for example, by defining a further triggering criterion defining an acceptable quality for the connection. Similarly as the triggering criterion relating to poor quality, the triggering criterion relating to an acceptable quality may be implemented either in the media gateway 355 or in the core network element 354. Typically both triggering criteria are implemented in the same network entity.

If the quality of the connection between the terminal 101 and the media gateway 355 improves, the core network element 354 may send a further triggering message (typically a BSSAP message) towards the access network control element in order to indicate that now quality has been improved. This BSSAP message typically contains a value indicating "Quality Ok" (see table in FIG. 5). An UMA-compliant terminal, when receiving a quality indication indicating a good quality connection, typically stops any handover procedures in accordance with the UMA standards.

Figure 6:
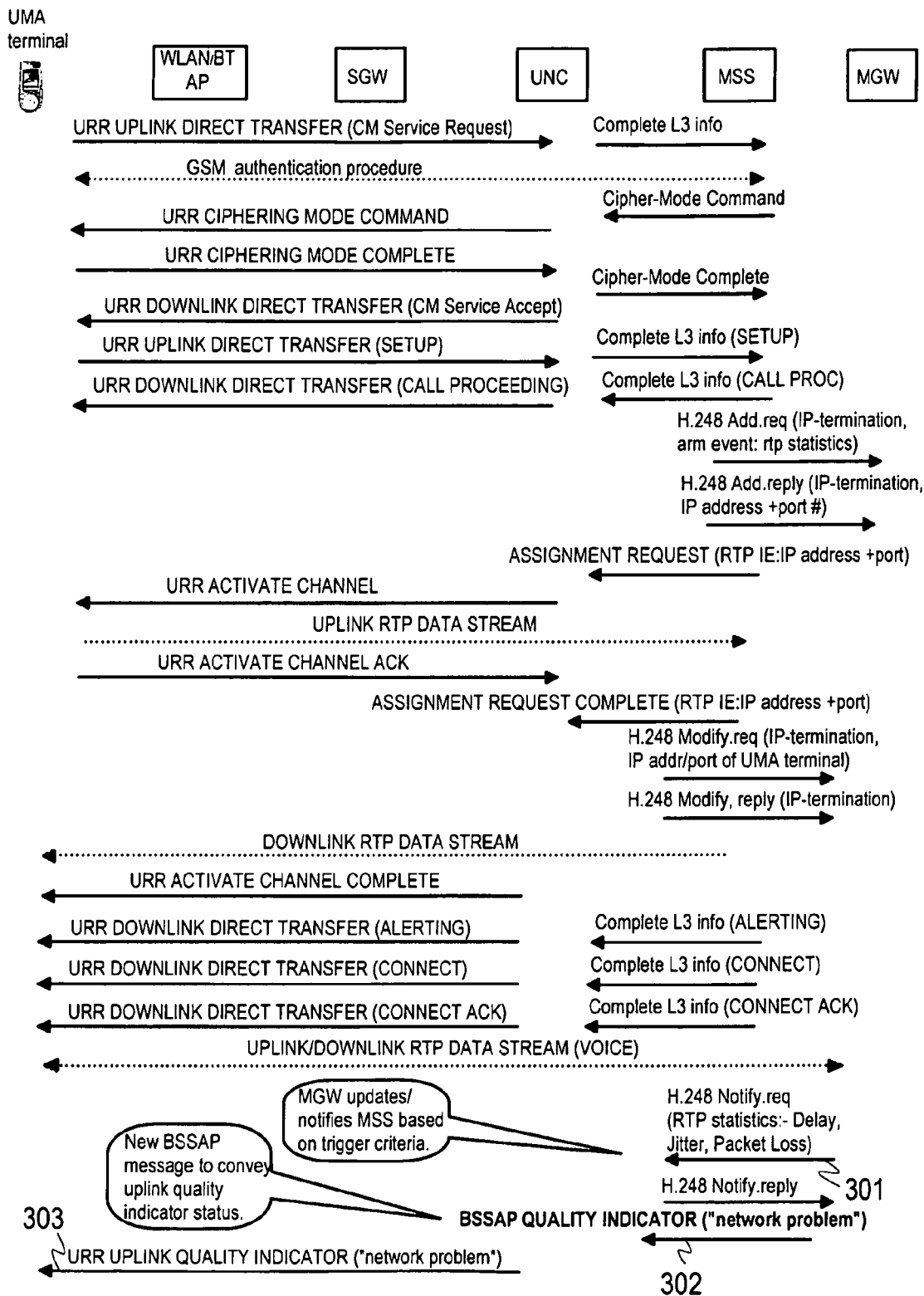
FIG. 6 shows a message sequence chart relating to call establishment and indicating a degraded quality of the connection to the terminal.

FIG. 6 shows a message sequence chart relating to call establishment and indicating a degraded quality of the connection to the terminal 101. The messages relating to the call establishment and authentication of the UMA terminal are standard UMA messages, and they are therefore not discussed here in detail.

At some point during the connection, the quality of the connection may degrade. The H.248 Notify message sent from the media gateway (MGW) to the core network element (namely to the MSC server (MSS)) is an example of a quality notification 301. The core network element may reply by sending a H.248 Notify Reply message to the media gateway. When the quality of the connection is so low that the triggering criterion relating to poor quality is fulfilled, a BSSAP quality indicator is sent to the access network control element (UNC in FIG. 6).

It is appreciated that typically methods in accordance of the invention in the various network elements are implemented with software. The computer program may be embodied in any computer readable medium or be carried on a signal.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method comprising:
   monitoring a quality of a connection between a terminal and a gateway in the gateway in a mobile communications system comprising a cellular access network and an alternative access network; and
   causing information to be sent to a core network element controlling the cellular access network and handling signaling relating to the connection about the quality of the connection by the gateway for triggering an access network control element to inform the terminal about the quality of the connection, wherein the access network control element informs the terminal about the quality of the connection via the alternative access network, wherein the terminal is connected to the mobile communications system via the alternative access network,
   wherein the gateway and access network control element are separate entities,
   and wherein the core network element is comprised in a core network portion of a cellular network.

2. The method as defined in claim 1, comprising: generating a quality notification indicating the quality of the connection based on the monitoring; and
   causing the quality notification indicating the quality of the connection to be sent from the gateway to the core network element handling signaling relating to the connection.

3. The method as defined in claim 2, wherein the generating comprises generating a notify message in accordance with the H.248 standard.

4. The method as defined in claim 1, wherein the monitoring the quality of the connection comprises monitoring at least one of a jitter, a wander, a packet loss, and a delay.

5. The method as defined in claim 1, wherein the causing information to be sent comprises causing information to be sent to the core network element periodically about the quality of the connection.

6. The method as defined in claim 1, wherein the causing information to be sent comprises causing information to be sent to the core network element in response to a predefined triggering criterion relating to a poor connection quality being fulfilled.

7. The method as defined in claim 6, wherein the predefined triggering criterion takes into account at least one of a jitter, a wander, a packet loss, and a delay.

8. The method as defined in claim 6, comprising informing the core network element in response to a further predefined triggering criterion relating to acceptable connection quality being fulfilled.

9. The method as defined in claim 1, comprising informing the terminal about the quality of the connection by the access network control element.

10. The method according to claim 1, wherein the information relating the quality of the connection fulfills a predefined triggering criterion relating to a poor connection is for triggering an access network control element to inform the terminal about the quality of the connection.

11. The method according to claim 4, wherein causing information to be sent to the core network element comprises causing information indicating at least one of monitored jitter, wander, packet loss, or delay to be sent to the core network element.

12. A method comprising:
   handling signaling relating to a connection between a terminal and a gateway in a core network element of a mobile communications system comprising a cellular access network and an alternative access network;
   receiving information indicating a quality of the connection between the terminal and the gateway from the gateway in the core network element; and
   causing a triggering message indicating the quality of the connection to be sent from the core network element to an access network control element to trigger the access network control element to inform the terminal about the quality of the connection, wherein the access network control element informs the terminal about the quality of the connection via the alternative access network, wherein the terminal is connected to the mobile communications system via the alternative access network, and wherein the core network element controls the cellular access network,
   wherein the gateway and access network control element are separate entities
   and wherein the core network element is comprised in a core network portion of a cellular network.

13. The method as defined in claim 12 wherein causing a triggering message to be sent comprises:
   generating a triggering message indicating the quality of the connection.

14. The method as defined in claim 13, wherein the generating comprises generating a message in accordance with the base station system application part protocol.

15. The method as defined in claim 12, wherein the triggering is performed in response to receiving the information indicating quality of the connection.

16. The method as defined in claim 15, comprising triggering the access network control element to inform the terminal about an improved quality of the connection in response to receiving further information about the quality of the connection from the gateway.

17. The method as defined in claim 12, comprising determining whether a predetermined triggering criterion relating to a poor quality connection is fulfilled, wherein the triggering is performed in response to the predetermined triggering criterion being fulfilled.

18. The method as defined in claim 17, comprising:
determining whether a further predetermined triggering criterion relating to an acceptable quality connection is fulfilled; and
triggering the access network control element to inform the terminal about an improved quality of the connection in response to the further predetermined triggering criterion being fulfilled.

19. The method as defined in claim 12, wherein the receiving comprises receiving a quality notification indicating the quality of the connection between the terminal and the gateway from the gateway in the core network element.

20. The method as defined in claim 19, wherein the quality notification is a notify message in accordance with the H.248 standard.

21. The method as defined in claim 12, wherein the received information indicating the quality of the connection indicates at least one of a jitter, a wander, a packet loss, and a delay.

22. The method according to claim 12, wherein, when the information relating the quality of the connection fulfills a predefined triggering criterion relating to a poor connection, the core network element sends the triggering message.

23. An apparatus comprising at least one processor and at least one memory storing computer program code, wherein the at least one memory and stored computer program code are configured, with the at least one processor, to cause the apparatus to at least:
monitor quality of a connection between a terminal and a gateway in the gateway in a mobile communications system comprising a cellular access network and an alternative access network; and
cause information to be sent to a core network element controlling the cellular access network and handling signaling relating to the connection about the quality of the connection to trigger an access network control element to inform the terminal about the quality of the connection, wherein the access network control element informs the terminal about the quality of the connection via the alternative access network, wherein the terminal is connected to the mobile communications system via the alternative access network,
wherein the gateway and the access network control element are separate entities,
and wherein the core network element is comprised in a core network portion of a cellular network.

24. The apparatus according to claim 23, wherein the information relating the quality of the connection fulfills a predefined triggering criterion relating to a poor connection is to trigger an access network control element to inform the terminal about the quality of the connection.

25. An apparatus comprising at least one processor and at least one memory storing computer program code, wherein the at least one memory and stored computer program code are configured, with the at least one processor, to cause the apparatus to at least:

handle signaling relating to connections between at least one terminal and a gateway in a mobile communications system comprising a cellular access network and an alternative access network;
control the cellular access network;
receive information indicating a quality of a connection between the at least one terminal and the gateway; and
cause a triggering message indicating the quality of the connection to an access network control element to trigger the access network control element to inform the terminal about the quality of the connection, wherein the access network control element informs the terminal about the quality of the connection via the alternative access network, wherein the terminal is connected to the mobile communications system via the alternative access network,
wherein the gateway and access network control element are separate entities,
and wherein the apparatus comprises a core network element comprised in a core network portion of a cellular network.

26. The apparatus according to claim 25, wherein, the core network element sends the triggering message in response to the information relating the quality of the connection fulfilling a predefined triggering criterion relating to a poor connection.

27. A computer program product comprising at least one non-transitory computer readable storage medium, the at least one computer readable storage medium storing a computer program configured to control a processor to perform operations comprising:
monitoring a quality of a connection between a terminal and a gateway in a mobile communications system comprising a cellular access network and an alternative access network; and
causing information to be sent to a core network element controlling the cellular access network and handling signaling relating to the connections about the quality of the connections for triggering an access network control element to inform the terminal about the quality of the connection, wherein the access network control element informs the terminal about the quality of the connection via the alternative access network, wherein the terminal is connected to the mobile communications system via the alternative access network,
wherein the gateway and access network control element are separate entities,
and wherein the core network element is comprised in a core network portion of a cellular network.

28. A computer program product comprising at least one non-transitory computer readable storage medium, the at least one computer readable storage medium storing a computer program configured to control a processor to perform operations comprising:
handling signaling relating to a connection between a terminal and a gateway in a core network element of a mobile communications system comprising a cellular access network and an alternative access network;
controlling the cellular access network;
receiving information indicating a quality of the connection between the terminal and the gateway;
causing a triggering message indicating the quality of the connection from the core network element to be sent to an access network control element to trigger the access network control element to inform the terminal about the quality of the connection, wherein the access network control element informs the terminal about the quality of the connection via the alternative access network, wherein the terminal is connected to the mobile communications system via the alternative access network,
wherein the gateway and access network control element are separate entities,
and wherein the core network element is comprised in a core network portion of a cellular network.

29. A system comprising:
a cellular access network;
an alternative access network;
a gateway; and
a core network element; wherein:
   the gateway is configured to handle connections between at least one terminal and the gateway, monitor quality of the connections, and send information to the core network element handing signaling relating to the connection about the quality of the connections; and
   the core network element is configured to control the cellular access network and handle signaling relating to connections between at least one terminal and the gateway, receive information indicating a quality of a connection between the at least one terminal and the gateway, and send a triggering message indicating the quality of the connection from the core network element to an access network control element to trigger an access network control element to inform the terminal about the quality of the connection, wherein the access network control element informs the terminal about the quality of the connection via the alternative access network, wherein the terminal is connected to the system via the alternative access network,
wherein the gateway and access network control element are separate entities,
   and wherein the core network element is comprised in a core network portion of a cellular network.

30. A system as defined claim 29, further comprising the access network control element, wherein the access network control element is configured to handle signaling relating to connections between at least one terminal and the gateway, receive triggering information indicating a quality of the connections between the at least one terminal and the gateway from a the core network element, and inform respective terminals about the quality of the connections based on the triggering information.

31. An apparatus comprising:
   means for monitoring quality of a connection between a terminal and a gateway in a mobile communications system comprising a cellular access network and an alternative access network; and
   means for causing information to be sent to a core network element controlling the cellular access network and handling signaling relating to the connection about the quality of the connections for triggering an access network control element to inform the terminal about the quality of the connection, wherein the access network control element informs the terminal about the quality of the connection via the alternative access network, wherein the terminal is connected to the mobile communications system via the alternative access network,
wherein the gateway and access network control element are separate entities,
and wherein the core network element is comprised in a core network portion of a cellular network.

32. An apparatus comprising:
   means for handling signaling relating to a connection between a terminal and a gateway in a mobile communications system comprising a cellular access network and an alternative access network;
   means for controlling the cellular access network;
   means for receiving information indicating a quality of a connection between the terminal and the gateway; and
   means for causing a triggering message indicating the quality of the connection to be sent to an access network control element to trigger the access network control element to inform the terminal about the quality of the connection, wherein the access network control element informs the terminal about the quality of the connection via the alternative access network, wherein the terminal is connected to the mobile communications system via the alternative access network,
wherein the gateway and access network control element are separate entities
and wherein the apparatus comprises a core network element comprised in a core network portion of a cellular network.

33. A system comprising a gateway and a core network element, wherein:
   the gateway comprises means for handling connections between at least one terminal and the gateway, means for monitoring quality of the connections, and means for causing information to be sent to the core network element; and
   the core network element comprises means for controlling a cellular access network, means for handling signaling relating to connections between at least one terminal and the gateway, means for receiving information indicating a quality of a connection between the at least one terminal and the gateway, and means for causing a triggering message indicating the quality of the connection to be sent from the core network element to an access network control element to trigger the access network control element to inform the terminal about the quality of the connection, wherein the access network control element informs the terminal about the quality of the connection via the alternative access network,
wherein the gateway and access network control element are separate entities,
and wherein the core network element is comprised in a core network portion of a cellular network.

* * * * *